(12) United States Patent
Andersson et al.

(10) Patent No.: US 10,544,745 B2
(45) Date of Patent: Jan. 28, 2020

(54) ENGINE SELF-ADJUSTMENT SYSTEM

(71) Applicant: Walbro LLC, Tucson, AZ (US)

(72) Inventors: Martin N. Andersson, Caro, MI (US); Dale P. Kus, Cass City, MI (US)

(73) Assignee: Walbro LLC, Tucson, AZ (US)

(*) Notice: Subject to any disclaimer, the term of this patent is extended or adjusted under 35 U.S.C. 154(b) by 14 days.

(21) Appl. No.: 16/070,804

(22) PCT Filed: Jan. 18, 2017

(86) PCT No.: PCT/US2017/013918
§ 371 (c)(1),
(2) Date: Jul. 18, 2018

(87) PCT Pub. No.: WO2017/127415
PCT Pub. Date: Jul. 27, 2017

(65) Prior Publication Data
US 2019/0048817 A1    Feb. 14, 2019

Related U.S. Application Data

(60) Provisional application No. 62/280,819, filed on Jan. 20, 2016.

(51) Int. Cl.
F02D 41/06 (2006.01)
F02D 41/24 (2006.01)
F02B 75/02 (2006.01)
G01M 15/05 (2006.01)

(52) U.S. Cl.
CPC ............ *F02D 41/064* (2013.01); *F02B 75/02* (2013.01); *F02D 41/068* (2013.01); *F02D 41/2454* (2013.01); *G01M 15/05* (2013.01); *F02B 2075/025* (2013.01); *F02B 2075/027* (2013.01); *F02D 2200/101* (2013.01); *F02D 2400/02* (2013.01); *F02D 2400/04* (2013.01)

(58) Field of Classification Search
CPC .. F02D 41/061; F02D 41/068; G01M 15/042; G01M 15/046; G01M 15/05
See application file for complete search history.

(56) References Cited

U.S. PATENT DOCUMENTS 4,442,815 A    4/1984    Ninomiya
4,829,963 A    5/1989    Oblaender et al.
(Continued)

FOREIGN PATENT DOCUMENTS

WO    WO2014150749 A1    9/2014

OTHER PUBLICATIONS

Written Opinion & International Search Report for PCT/US2017/013918 dated Apr. 25, 2017, 10 pages.

*Primary Examiner* — Thomas N Moulis
(74) *Attorney, Agent, or Firm* — Reising Ethington P.C.

(57) ABSTRACT

A utility engine air-to-fuel ratio control method in which during an initial or early part of a period of engine continuous operation its stability of operation is determined and if sufficiently stable a test of the air-to-fuel ratio of the air-fuel mixture supplied to the engine is performed and if need be changed to a new air-to-fuel ratio supplied to the engine during the remainder of the period of engine continuous operation. If the engine operation is not sufficiently stable the test is not started or if started is aborted.

12 Claims, 5 Drawing Sheets

(56) References Cited

U.S. PATENT DOCUMENTS

| | | | | |
|---|---|---|---|---|
| 4,933,863 A | * | 6/1990 | Okano | F02D 31/004 |
| | | | | 123/480 |
| 5,265,416 A | * | 11/1993 | Hamburg | F01N 11/007 |
| | | | | 60/274 |
| 5,809,971 A | | 9/1998 | Svensson et al. | |
| 7,448,358 B2 | | 11/2008 | Andersson et al. | |
| 7,546,846 B2 | | 6/2009 | Massengale et al. | |
| 9,631,736 B2 | | 4/2017 | Kus et al. | |
| 9,702,312 B2 | | 7/2017 | Andersson et al. | |
| 2001/0020458 A1 | * | 9/2001 | Mikame | F01L 1/34406 |
| | | | | 123/90.15 |
| 2006/0236990 A1 | * | 10/2006 | Annoura | F02D 41/008 |
| | | | | 123/673 |
| 2008/0040018 A1 | * | 2/2008 | Katoch | F02D 13/0215 |
| | | | | 701/103 |
| 2010/0024785 A1 | * | 2/2010 | Yoshioka | F02D 13/0219 |
| | | | | 123/559.1 |
| 2011/0202258 A1 | | 8/2011 | Fukushima et al. | |

* cited by examiner

ENGINE SELF-ADJUSTMENT SYSTEM

REFERENCE TO RELATED APPLICATIONS

This application claims the benefit of U.S. Provisional Patent Application Ser. No. 62/280,819, filed on Jan. 20, 2016, which is incorporated herein by reference in its entirety.

TECHNICAL FIELD

The present disclosure relates generally to utility internal combustion engines and more particularly to a fuel control system and method for such engines.

BACKGROUND

Small or utility internal combustion engines are used to power a variety of various products including lawn and garden products such as chain saws, lawn mowers, edgers, grass and weed string trimmers, leaf air blowers and the like. Many of these engines are single cylinder two-cycle or four-cycle spark ignited gasoline powered internal combustion engines having a carburetor or other device supplying a gasoline fuel and air mixture to the combustion chamber of the operating engine. The ratio of air-to-fuel of the fuel mixture may be calibrated for a particular engine or a particular product but different engine operating characteristics such as varying loads during use of the product, type of fuel, altitude, condition of the air filter and/or differences among engines and/or components in a production run may adversely affect engine operation and performance. To improve engine performance and operation under a variety of these and other conditions, some engines include a control system and process which throughout essentially every period of engine continuous operation repeatedly and substantially continuously tests and determines whether a proper air-to-fuel ratio of the fuel mixture is being supplied to the engine and, if not, changes the air-to-fuel ratio of the supplied fuel mixture to improve engine operation and performance and often to control exhaust emissions to comply with Governmental regulations.

One such system and method which essentially continuously tests and if need be changes the ratio of air-to-fuel of a fuel mixture it delivers to an operating engine is disclosed in U.S. patent application Ser. No. 14/773,993, filed Sep. 9, 2015, the disclosure of which is incorporated herein by reference in its entirety. In this method, the engine operating speed is sensed and determined, an air-to-fuel ratio of a fuel mixture delivered to the operating engine is changed and preferably enleaned, and a second engine speed is sensed and determined after at least some and preferably near the end of the changed air-to-fuel ratio event. Based at least in part on the difference between the first and second engine speeds, it is determined whether a change in the air-to-fuel ratio of the fuel mixture supplied to the engine is needed or desired and, if so, a change in the air-to-fuel ratio of the fuel mixture delivered to the engine is implemented. Developing such a control system and method which is always trying to automatically sense and adjust the air-to-fuel ratio of the operating engine in the field or essentially continuously during the entire time period of each engine operation can be difficult and requires relatively complex programming in order to essentially eliminate the risk of erroneous automatic self-adjustment events which may be initiated by unforeseen engine operating conditions.

SUMMARY

In some implementations, only during part of a period of engine operation is it determined whether a process should be initiated to test and determine whether the engine air-to-fuel ratio should be changed and a new ratio used for at least the remainder of the period of engine continuous operation. In some implementations, this process is initiated only after a cold start, initial warm-up, and stable operation of the engine is achieved near the beginning of the engine operating period. If the process is initiated, it may include the steps of determining a first engine speed, changing the air-to-fuel ratio of a fuel mixture supplied to the engine, determining a second engine speed after at least some of the air-to-fuel ratio change event has occurred and preferably at or near the end of such event. Based at least in part on the difference between the first and second engine speeds it is determined whether a change in air-to-fuel ratio should be made and, if so, a new air-to-fuel ratio is determined and supplied to the engine for at least the remainder of the engine operating period and desirably for at least the beginning of the next or immediately subsequent engine operating period.

BRIEF DESCRIPTION OF THE DRAWINGS

The following detailed description of preferred embodiments and best mode will be set forth with reference to the accompanying drawings, in which.

DETAILED DESCRIPTION OF PREFERRED EMBODIMENTS

Figure 1:
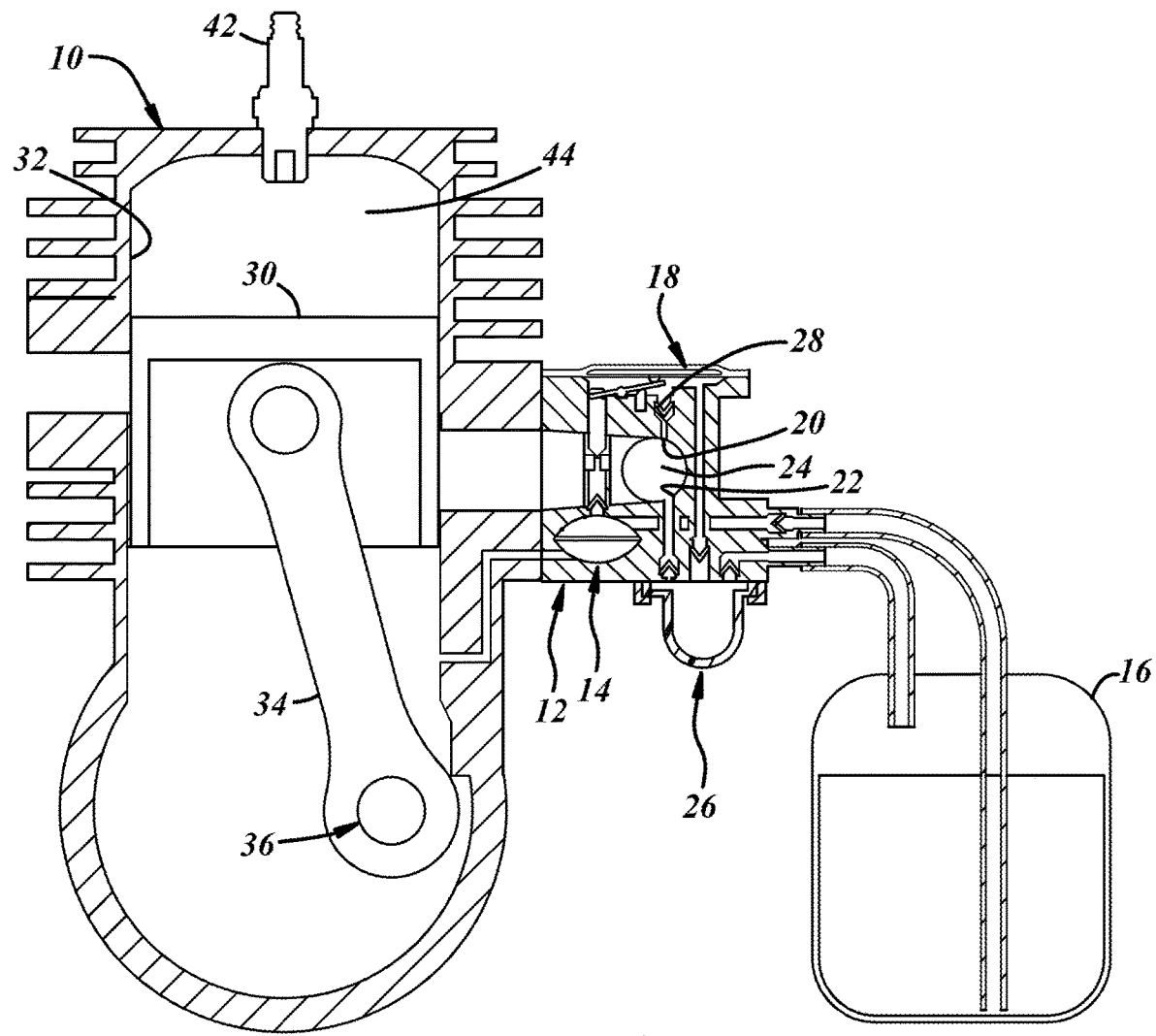
FIG. 1 is a schematic view of an engine and a carburetor including an air-to-fuel ratio change device.

Referring in more detail to the drawings, FIG. 1 illustrates a spark ignited gasoline powered internal combustion engine 10 with a charge forming device that delivers a fuel-and-air mixture to the operating engine. The charge forming device may be a fuel injector, carburetor or another device. The charge forming device is illustrated as a carburetor such as a diaphragm carburetor 12 which is typically used on engines for chain saws, air blowers, grass and weed trimmer products and the like. The carburetor 12 has a diaphragm actuated fuel pump 14 which receives liquid gasoline fuel from a fuel tank 16 and supplies fuel to a diaphragm fuel metering system 18 which supplies fuel through a main nozzle or jet 20 to a fuel-and-air mixing passage 22 communicating with the engine. The carburetor includes a throttle valve 24 movable between idle and wide open throttle positions to control the flow or quantity of the air-fuel mixture supplied to the operating engine. This carburetor typically includes a manually actuated fuel purge and primer assembly 26. The general construction, function and operation of such a diaphragm carburetor is well known in the art and one example of this type of carburetor is disclosed in U.S. Pat. No. 7,467,785, the disclosure of which is incorporated herein by reference in its entirety.

The carburetor 12 also has a mixture control device such as a solenoid valve assembly 28 which is operable to change the quantity of fuel flowing into the mixing passage 22 such as through the main fuel jet 20 to thereby alter or change the air-to-fuel ratio of the fuel mixture supplied by the carburetor to the operating engine as controlled by the throttle valve. The solenoid valve assembly 28 may be normally open and energized to close to enlean the air-to-fuel ratio of the air-fuel mixture supplied to the operating engine. A suitable solenoid control valve is disclosed in U.S. patent application Ser. No. 14/896,764, filed Dec. 8, 2015, which is incorporated herein by reference in its entirety.

Typically, the engine 10 is a utility or light duty single cylinder two-stroke or four-stroke spark ignited gasoline powered internal combustion engine. Typically, this engine has a single piston 30 slidably received for reciprocation in a cylinder 32 connected by a tie-rod 34 to a crankshaft 36 attached to a flywheel 38. Typically, this engine has a capacitive discharge ignition (CDI) system module 40 for supplying a high voltage ignition pulse to a spark plug 42 for igniting an air-fuel mixture in the engine cylinder combustion chamber 44. This module 40 varies and controls the ignition timing relative to a top dead center position of the piston in response to changing engine operating conditions.

Typically, this engine 10 does not have any battery supplying an electric current to the spark plug or powering the ignition control module which typically includes a microcontroller. This engine is manually cranked for starting with an automatic recoil rope starter.

Figure 2:
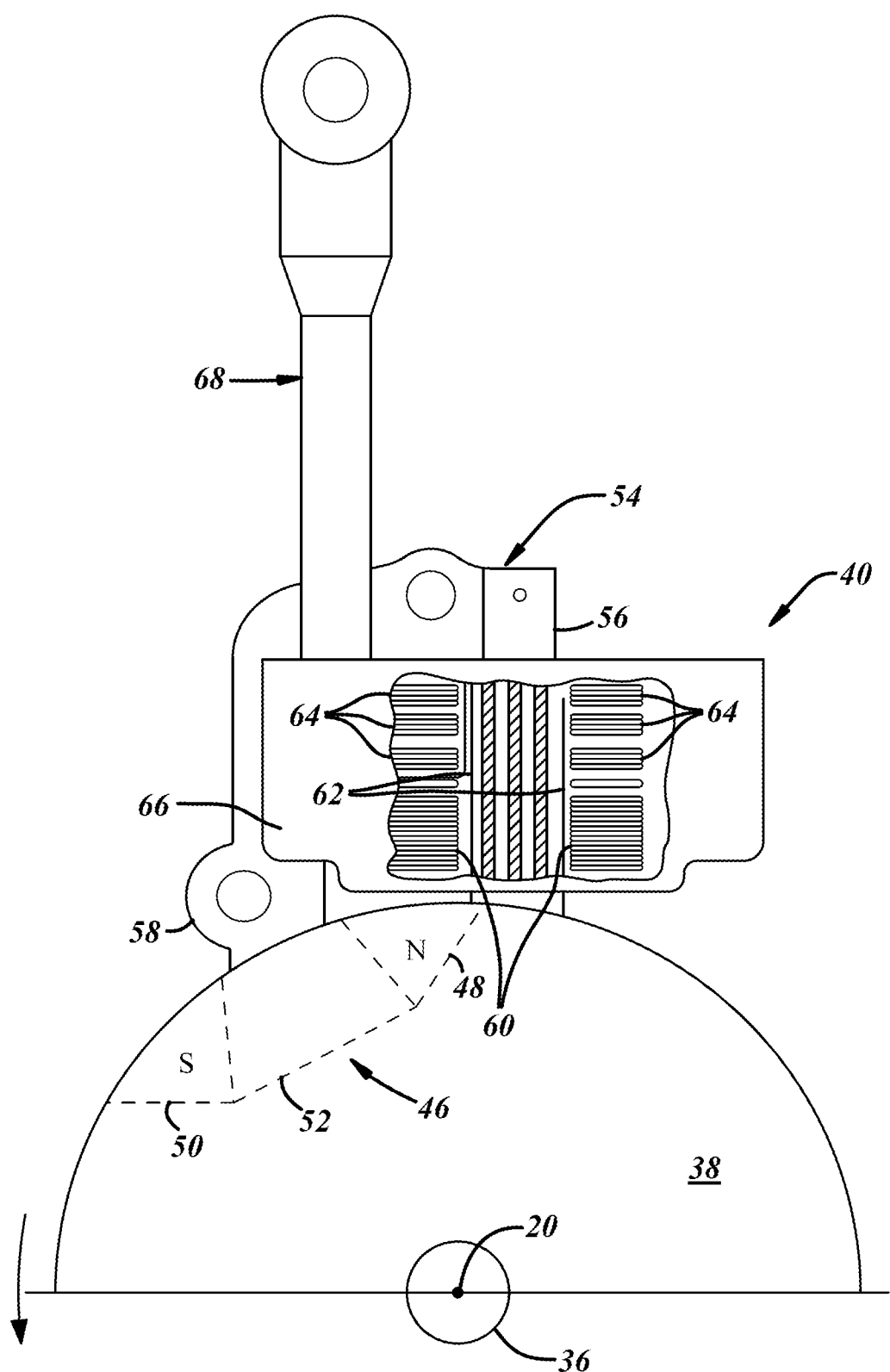
FIG. 2 is a fragmentary view of a flywheel and ignition component of the engine.
Figure 3:
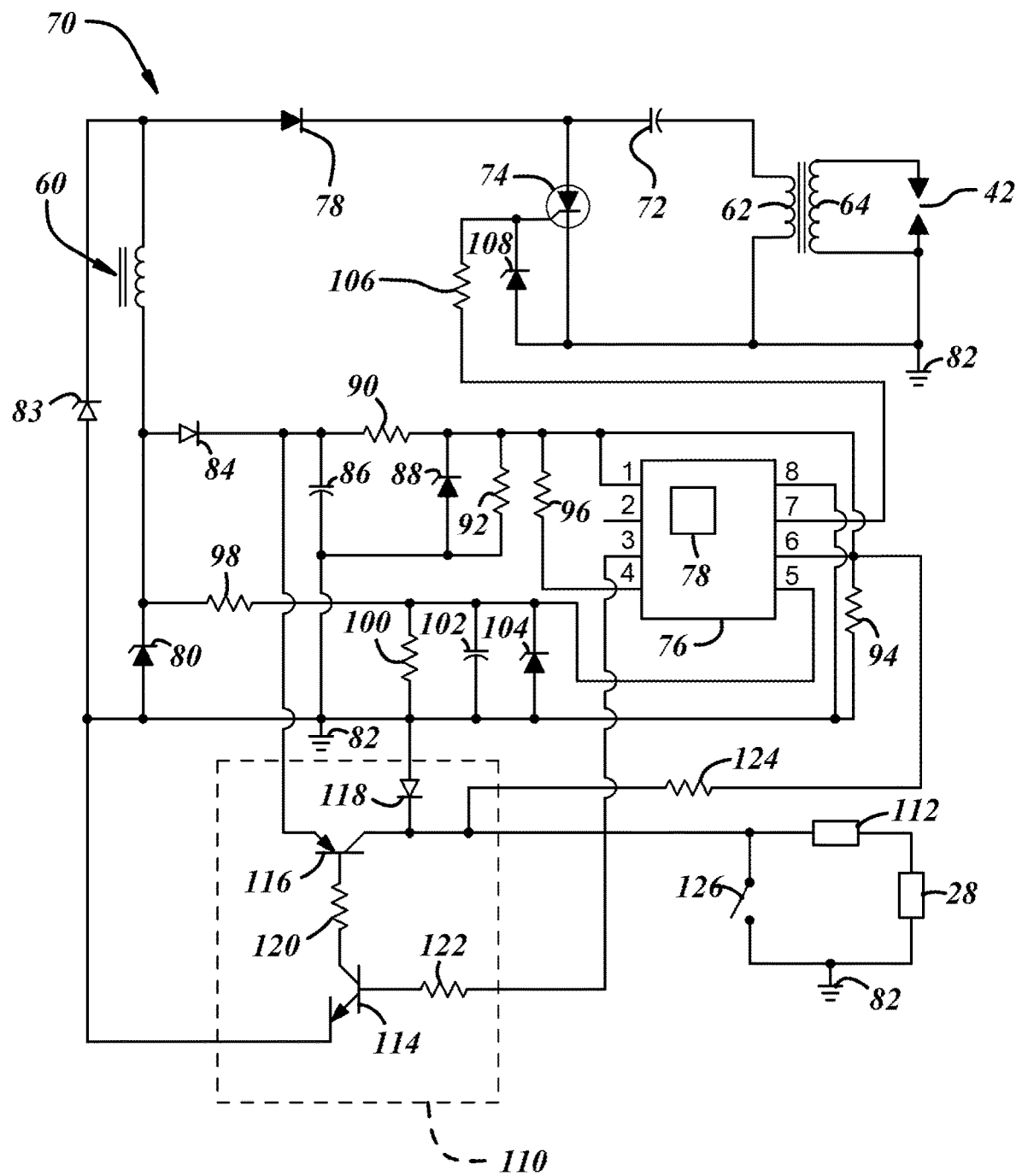
FIG. 3 is a schematic diagram of an engine ignition and air-to-fuel ratio control circuit.

FIGS. 2 and 3 illustrate an exemplary engine ignition and air-to-fuel ratio control system for use with the internal combustion engine. This control system could be constructed according to any one of numerous designs including a magneto and capacitor discharge spark ignition system. This magneto system includes a magnetic section 46 with north and south pole shoes 48 & 50 with a permanent magnet(s) 52 mounted on the flywheel 38 for rotation therewith such that when rotating it induces a magnetic flux in a nearby stator assembly of the control module as the magnetic section passes thereby.

The stator assembly includes a lamstack 54 having a first leg 56 and a second leg 58 (separated from the rotating flywheel by a relatively small measured air gap which may be about 0.3 mm), a charge or power coil winding 60, an ignition transformer primary coil winding 62 and a secondary transformer coil winding 64 which may all be wrapped around a single leg of the lamstack. The lamstack 54 may be a generally U-shaped ferrous armature made from a stack of iron plates and may be in a module housing 66 located on the engine. The ignition primary and secondary coil windings provide a step-up transformer and as is well known by those skilled in the art, the primary winding 62 may have a comparatively few turns of a relatively heavy gauge wire, while the secondary ignition coil winding 64 may have many turns of a relatively fine wire. The ratio of turns between the primary and secondary ignition windings generates a high voltage potential in the secondary winding that is used to fire the spark plug 42 of the engine to provide an electric arc or spark and consequently ignite an air-fuel mixture in the engine combustion chamber 44. The high voltage in the secondary winding is supplied to the spark plug through an insulated electric wire 68 connected to the center electrode of the spark plug covered by an insulating boot.

As shown in FIG. 3, the power coil and the transformer coils are coupled to an ignition and control circuit 70 of the control module 40. The term "coupled" broadly encompasses all ways in which two or more electrical components, devices, circuits, etc. can be in electrical communication with one another; this includes, but is not limited to, a direct electrical connection and a connection being an intermediate component, device, circuit, etc. This control circuit 70 includes an energy storage and ignition discharge capacitor 72, an electronic ignition switch 74 preferably in the form of a thyristor, such as a silicon controlled rectifier (SCR), and a microcontroller 76. One end of the power coil 60 is connected through a diode 78 to the ignition capacitor 72 and the other end of the power coil is connected through a diode 80 to the circuit ground 82. The one end of the power coil may also be connected through another diode 83 to the circuit ground. A majority of the energy induced in the power coil is supplied to the capacitor 72 which stores this energy until the microcontroller 76 changes the switch 74 to a conductive state to discharge the capacitor 72 through the primary winding 62 of the transformer which induces in the secondary winding 64 a high voltage potential which is applied to the spark plug 42 to provide a combustion igniting arc or spark. More specifically, when the ignition switch 74 is turned on (in this case, becomes conductive), it provides a discharge path for the energy stored on the capacitor 72. This rapid discharge of the capacitor causes a surge in current through the primary ignition winding 62 which in turn creates a fast rising electromagnetic field in the primary ignition winding which induces a high voltage pulse in the secondary ignition winding 64 which travels to the spark plug 42 to produce an arc or spark. Other sparking techniques, including a flyback technique, may be used instead.

The microcontroller 76 may include a memory 78 which can store a look-up table, algorithm, and/or code to determine and vary the engine ignition timing relative to top dead center of the piston 30 in the cylinder 32 for various engine operating speeds and conditions. The microcontroller may also change and control the fuel-to-air ratio of the air and fuel mixture supplied to the operating engine in response to various engine operating speeds and conditions. Various microcontrollers or microprocessors may be used as is known to those skilled in the art. Suitable commercially available microcontrollers include Atmel ATtiny series and Microchip PIC 12 family. Examples of how microcontrollers can implement ignition timing systems can be found in U.S. Pat. Nos. 7,546,846 and 7,448,358, the disclosures of which are incorporated herein by reference in their entirety. The memory 78 may be a reprogrammable or flash EEPROM (electrically erasable, programmable read-only memory). In other instances, the memory may be external of and coupled to the microcontroller. The memory should be construed broadly to include other types of memory such as RAM (random access memory), ROM (read-only memory), EPROM (erasable, programmable, read-only memory), or any other suitable non-transitory computer readable medium.

As shown in FIG. 3, the microcontroller 76 includes eight pins. To power the microcontroller, the circuit has a diode 84, a capacitor 86, a zener diode 88, and resistors 90 & 92 electrically connected in the circuit to the power coil 60 and to pin 1. Pin 4 is an input pin which does not perform any function in this circuit and is connected through a resistor 96 to pin 1 to avoid any circuit noise adversely affecting the microcontroller performance.

An electronic signal representative of the engine speed and the position of its piston in its combustion chamber usually relative to the top dead center (TDC) position of the piston is provided to pin 5 through a connection to the power coil via resistors 98 and 100, a capacitor 102 and a zener diode 104. The resistor 100, capacitor 102 and zener diode 104 are also connected to the circuit ground 82. This signal can be referred to as a speed signal and the microcontroller 76 can use this speed signal to determine engine speed (RPM), the timing of an ignition pulse relative to the piston TDC position (usually from a look-up table), and whether or not and, if so, when to activate the switch 74 to provide an ignition pulse. To control the ignition switch 74, microcontroller pin 7 is connected to the gate of the ignition switch via a resistor 106 (which is in circuit with a zener diode 108 connected to the cathode and ground 82) and transmits from the microcontroller an ignition signal which controls the state of the switch 74. When the ignition signal on pin 7 is low, the ignition switch 74 is non-conductive and the capacitor 72 is allowed to charge. When the ignition signal is high, the ignition switch 74 is conductive and the ignition capacitor 72 discharges through the primary ignition transformer coil 62, thus causing a high voltage ignition pulse to be induced in the secondary ignition coil 64 and applied to the spark plug 42. Thus, the microcontroller 76 governs the discharge capacitor 72 by controlling the conductive state of the SCR or switch 74. Through pin 8, the microcontroller ground is connected to the circuit ground 82.

The microcontroller 76 may also be used to actuate the solenoid control valve 28, although alternatively a separate controller may be used. As shown in FIG. 3, the control circuit 70 may include a solenoid valve driver sub-circuit 110 communicated with pin 3 of the controller and with the solenoid at a node or connector 112. When pin 3 goes high, it turns on the transistor 114 via resistor 122 which resistor 122 limits the current into the base of the transistor 114. When transistor 114 is turned on, current is allowed to flow from capacitor 86 via transistor 116, resistor 120 and via collector-emitter of transistor 114 to ground. This base current for transistor 116 will get amplified in the transistor 116 and allow a much higher current to flow from capacitor 86 via transistor 116 through the connector 112 to the solenoid valve 28. Diode 118 is placed in parallel with the solenoid to act as a recirculating diode when the transistor 116 is in its off state. Pin 3 of the microcontroller is controlled by pulse with modulation (PWM), usually at a frequency of 4-10 kHz. Therefore, transistor 116 will turn on and off very quickly. A resistor 124 is connected between connector 112 and pin 6, and is used together with resistor 94 to sense when the terminal 112 is connected to ground or not, through a normally open engine kill switch 126 which when closed causes the microcontroller 76 to stop the engine by not providing voltage pulses to the spark plug 42. Pin 3 also provides a short voltage pulse of about 20-100 microseconds which is sensed by pin 6 to determine whether the kill switch 126 is closed. This pulse does not provide enough energy to change the state of the solenoid valve 28.

Figure 4:
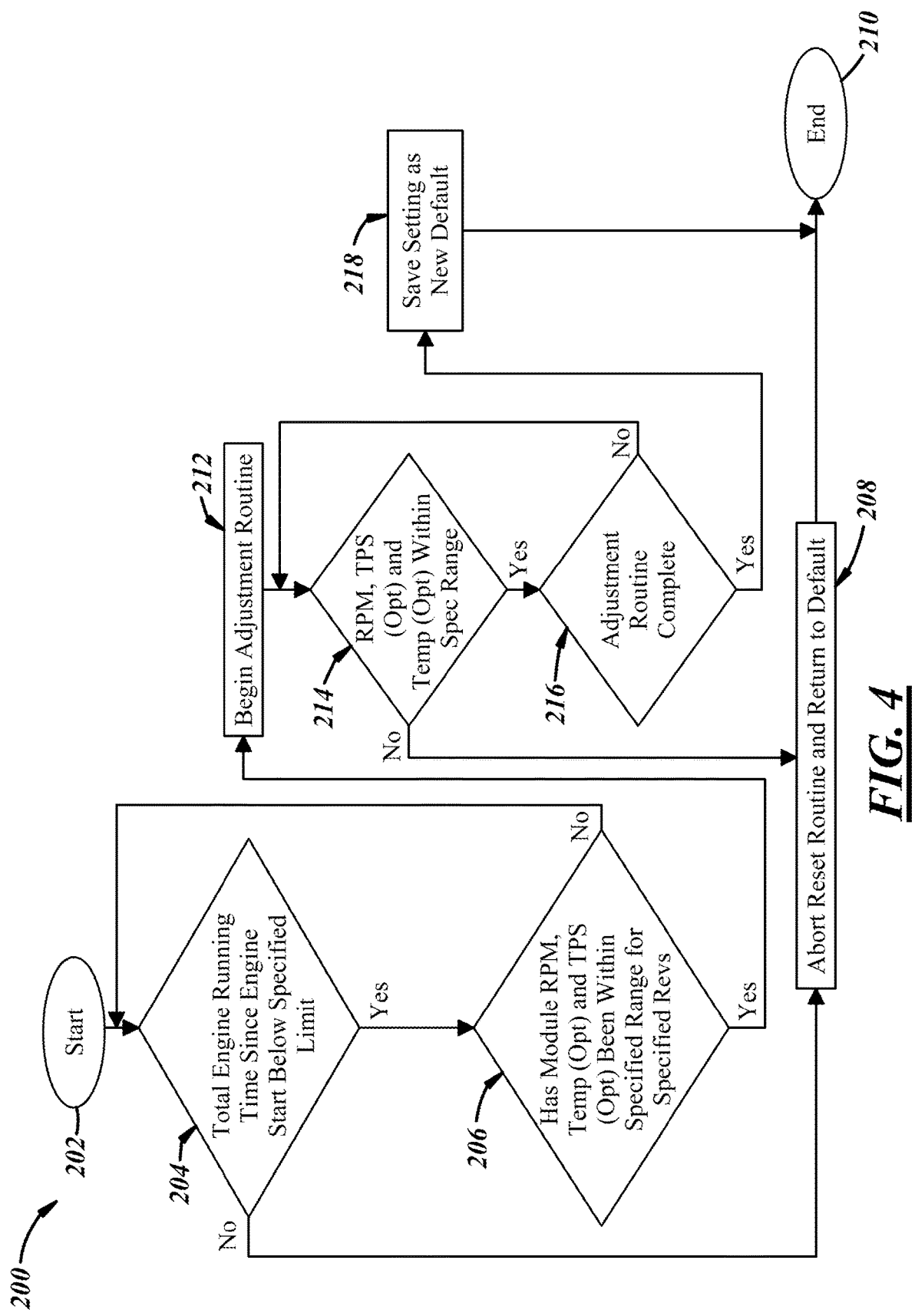
FIG. 4 is a flow chart of an air-to-fuel ratio test reset process.

FIG. 4 shows one implementation of a process 200 which may be carried out with the microprocessor 76 with suitable programming or by a separate processor with suitable programming to determine whether to initiate an air-to-fuel ratio testing portion (FIG. 5) described herein after the description of the rest of the process 200.

For engine start-up, a default air-to-fuel ratio stored in the memory 78 associated with or part of the microcontroller 76 may be utilized. As shown in FIG. 4, upon engine start-up, the microcontroller 76 starts at 202 the process 200 and initiates a determination step 204 of the time the engine has run since start-up such as by counting the number of complete revolutions of the engine crankshaft and determines whether the total time is below a specified limit. For a typical two-stroke engine, this time limit of step 204 may be in the range of 500 to 25,000 revolutions and for a four-stroke engine in the range of 1,000 to 50,000 revolutions. Usually this provides more than enough time for an engine to warm up from a cold start. If this time limit has not been exceeded, the processor 76 implements step 206 to determine whether the engine is operating in a sufficiently stable manner to begin or initiate the process portion 300 (FIG. 5) of testing and potential change of the air-to-fuel ratio. This stability determination may be made by sensing the engine speed (RPM) for a specified number of revolutions (N) and determining whether this engine speed was within a specified range for this specified number of revolutions. This determination may be based solely on engine speed or optionally in conjunction with sensing the engine temperature and/or the position of the carburetor throttle valve 24. If the engine is not sufficiently stable, the processor returns to step 204 to determine if the engine running time limit has expired and, if so, proceeds to step 208 to abort the process 200, uses the start-up default air-to-fuel ratio for the rest of the period in which the engine is continuously operating, and at 210 the process 200 is ended for the rest of this period. If the run time has not expired and the stability determination step 206 was not satisfied, the microcontroller again implements the step 206 to determine the stability of the operating engine. If within the time limit of step 204, the engine becomes sufficiently stable, the microcontroller at step 212 starts the portion 300 shown in FIG. 5 of the process 200.

Figure 5:
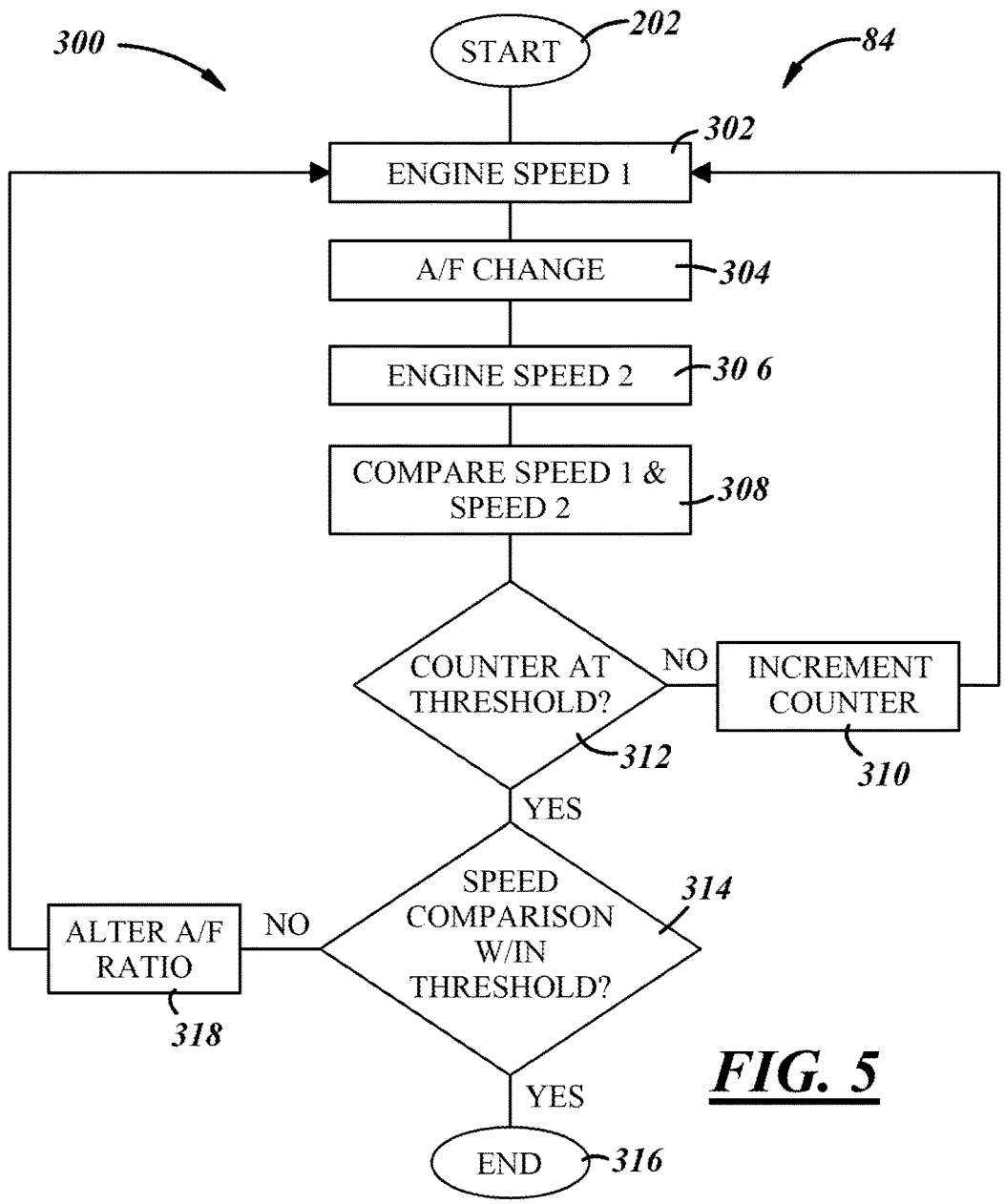
FIG. 5 is a flow chart of an air-to-fuel ratio test sensing and adjustment process.

As shown in FIG. 5, if the process portion 300 was started (at step 212), at step 302, the microcontroller determines a first engine speed, at step 304 changes and preferably enleans the engine start-up default air-to-fuel ratio such as by closing the fuel solenoid valve 28 for several engine revolutions, and at step 306 determines a second engine speed after at least some and desirably at or near the end of this air-to-fuel ratio change event of step 304. The first and second engine speed determinations or measurements 302 and 306 are compared at step 308. This enleanment can be accomplished in several different ways, including without limitation only partially closing the solenoid valve 28, bleeding air into the fuel flowing into the mixing passage, changing the pressure acting on the metering valve assembly, increasing air flow through the mixing passage downstream of the fuel jet 20, bleeding air into the mixing passage downstream of the fuel jet, and the like.

To improve accuracy of this process portion 300, desirably several of these engine speed tests may be performed with a counter incremented at 310 after each speed test, and the counter compared to a threshold at step 312 to determine if a desired number of engine speed tests have been performed. If not, the routine returns to steps 302 through 308 for another speed test. If a desired number of speed tests have been performed, at step 314 the process analyzes the difference(s) between engine speeds 1 & 2 (first and second engine speeds) compared to one or more thresholds. In step 314, minimum and maximum threshold values may be used for the engine speed difference that occurred as a result of enleaning the fuel mixture provided to the engine. An engine speed difference that is below the minimum threshold (which could be a certain number of RPM'S) most likely indicates that the air-to-fuel default ratio before that enleanment was richer than a mixture corresponding to a peak engine power. Conversely, an engine speed difference above a maximum threshold (which could be a certain greater number of RPM'S) indicates that the air-to-fuel ratio before enleanment was leaner than a mixture corresponding to a peak engine power.

Figure 6:
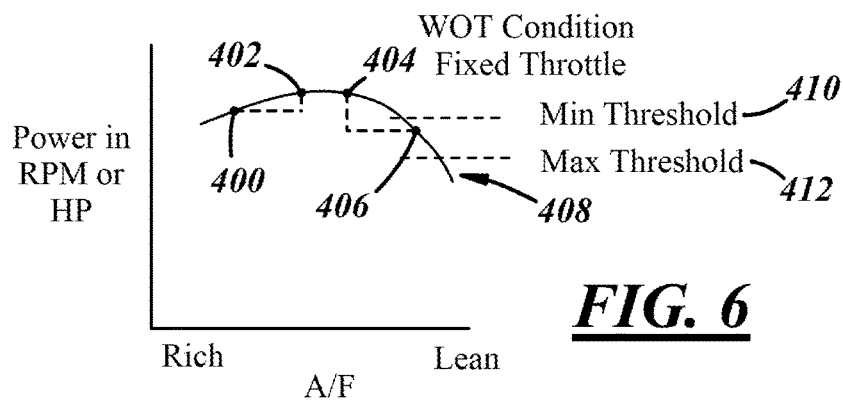
FIG. 6 is a graph of a representative engine power curve.

As shown in FIG. 6, for a given fixed position of the throttle valve 24 of the carburetor such as near or at the wide open throttle position, for the same amount of enleanment of the fuel mixture of the operating engine between points 400 and 402 and points 404 and 406 on the engine peak power curve 408, the difference in engine speed is greater between points 404 and 406 on the lean side of the fuel mixture from the peak power output than the engine speed difference on the richer side from the engine peak power output. Thus, for a given engine by selecting appropriate minimum threshold and maximum threshold speed changes 410 and 412 for the same amount of fuel enleanment, the process portion 300 can determine whether an air-to-fuel ratio of the fuel mixture is in an acceptable range or should be enleaned or enriched to achieve the desired engine operating power condition. For at least some two-cycle engines, the minimum engine speed differential threshold may be 15 RPM and the maximum engine speed differential threshold may be 500 RPM or higher. These values are illustrative and not limiting since different engines and conditions may use different thresholds.

If the engine speed difference of the speed test is within or complies with the threshold values of step 314, the process portion 300 may end at step 316 and the engine be operated throughout the rest of its continuous period with the default air-to-fuel ratio because it is within an acceptable range of predetermined desired air-to-fuel ratios.

If the engine speed difference is not within the thresholds as determined at step 314, the air-to-fuel ratio of the mixture may be changed at step 318 to a new air-to-fuel ratio and the engine speed tests and comparison of steps 302-314 repeated using the new air-to-fuel ratio. If the engine speed difference was less than the minimum threshold, this new air-to-fuel ratio may be further enleaned at step 318 before the engine speed test is repeated because the fuel mixture is still too rich or if this speed difference was greater than the maximum threshold, this new air-to-fuel ratio may be enriched at step 318 before the engine speed test is repeated because the mixture was too lean. The engine speed tests with changed air-to-fuel ratios can be repeated until the engine speed difference is within the thresholds of step 314. When a desired number of one or more engine speed differences complying with the thresholds of step 314 is obtained for a given changed air-to-fuel ratio, this given changed air-to-fuel ratio may be saved at step 218 of process 200 and used as the new default air-to-fuel ratio for the remainder of the period of engine continuous operation and desirably for the next engine start-up of the next period of engine operation.

The engine speed testing process portion 300 of FIG. 5 is disclosed in greater detail in U.S. patent application Ser. No. 14/773,993, filed on Sep. 9, 2015, which is incorporated herein by reference in its entirety.

The microcontroller 76, desirably but not necessarily, may in step 214 monitor and determine whether the speeds sensed during the engine speed testing of process portion 300 were significantly affected by a change in the position of the throttle valve 24 and thus the quantity of the air-fuel mixture supplied to the operating engine. In some implementations the throttle valve position can be directly determined by a switch, variable resistor or other position sensing device typically connected to a throttle valve shaft or a throttle lever. However, to reduce cost, for many small engine applications, it is desirable to eliminate any such device and determine whether the throttle position changed during the speed testing of process portion 300 by analyzing engine speed changes. Process 200 can do so at step 214 by determining whether the difference between the engine speed before enleanment (speed 1 of step 302) and the engine speed after recovery from the enleanment (a speed 3 after the engine is again operating with at least substantially and desirably the same air-to-fuel ration used in determining speed 1) is within a specified range such as 0 to 250 RPM or not greater than 250 RPM. If the difference between speeds 1 and 3 is greater than 250 RPM the process aborts the process portion 300 at step 208 and uses the default air-to-fuel ratio typically for the remainder of the period of engine continuous operation. Typically, this throttle position change speed range or threshold is narrower than the range between the minimum and maximum thresholds of step 314.

However, if the difference between the engine speeds 1 and 2 was not significantly adversely affected by a throttle valve position change, when the process portion 300 is completed as determined at step 216, any new air-to-fuel ratio determined by the process portion 300, is saved in the memory 78 of the microcontroller as the new default ratio at step 218 and is used typically for the remainder of the period of engine continuous operation and as the default ratio for the beginning of the next engine start-up. The process 200 (FIG. 4) is also ended at 210 and desirably not repeated during the remainder of this period of engine continuous operation.

In at least some implementations of the process for a single cylinder two-cycle engine, the time limit of step 204 of the total engine running time may be in the range of 500 to 25,000 total revolutions, in step 206 the engine speed may be in the range of 6,000 to 10,000 RPM within a specified range of 500 to 50,000 engine crankshaft revolutions, and in step 214 an acceptable difference between engine speed 1 and speed 3 may be in the range of 0 to 250 RPM desirably 0 to 100 RPM and preferably 40 to 100 RPM, and in step 314 the minimum threshold engine speed difference may be in the range of 10 to 100 RPM, and the maximum threshold speed difference may be in the range of 100 to 500 RPM and preferably in the range of 100 to 300 RPM.

In at least some implementations of the process for a single cylinder four-cycle engine, the time limit of step 204 of the total engine running time may be in the range of 1,000 to 50,000 total revolutions, in step 206 the engine speed may be in the range of 6,000 to 10,000 RPM within a specified range of 500 to 50,000 engine crankshaft revolutions, in step 214 an acceptable difference between engine speed 1 and speed 3 may be in the range of 0 to 250 RPM desirably 0 to 100 RPM and preferably 40 to 100 RPM, and in step 314 the minimum threshold engine speed difference may be in the range of 10 to 100 RPM, and the maximum threshold speed difference may be in the range of 100 to 600 RPM and preferably in the range of 100 to 400 RPM.

As used in this description, a period of engine continuous operation is from engine start-up to the first engine stopping after this start-up. The next start-up begins a new period of engine continuous operation which ends when the engine first stops after such next start-up. Upon this next start-up, the process 100 may again be started.

In at least some implementations, the process 200 decreases the risk of an incorrect adjustment of the air-to-fuel ratio due to unstable and/or unforeseen engine operating conditions by selecting and monitoring engine operating conditions in which engine operation is sufficiently stable to enable a successful testing and if need be changing of the air-to-fuel ratio of the operating engine. This process also provides a faster testing and any needed adjustment of air-to-fuel ratio because the engine will be operating under known stable engine operating conditions throughout the testing and any adjustment by process portion 300 and after the process 300 is completed or aborted desirably the air-to-fuel ratio will not be further adjusted or changed for the remainder of the period of operation of the engine. This process also reduces the complexity of programming the process portion 300 and decreases the required microcontroller memory because it is initiated and carried out only if the engine is operating in a stable condition and, if so, only once during a period of engine continuous operation.

While the forms of the invention herein disclosed constitute presently preferred embodiments, many others are possible. It is not intended to mention all the possible equivalent forms, modifications or ramifications of the invention. It is understood that the terms used herein are merely descriptive, rather than limiting, and that various changes may be made without departing from the spirit or scope of the invention.

The invention claimed is:

1. An engine control process, comprising:
starting an engine with a default air-to-fuel ratio of a fuel mixture supplied to the engine;
determining whether the total engine running time substantially from engine start-up is within a predetermined specified time limit;
within the time limit, determining whether the engine speed is within a predetermined range for a predetermined number of engine revolutions, and, if not, using the default air-to-fuel ratio for the remainder of the period of engine operation and, if so, initiating a process of testing whether the default air-to-fuel ratio should be changed and, if so, determining a desired new air-to-fuel ratio and using this desired new air-to-fuel ratio for the remainder of the period of continuous engine operation; and
during the process of testing the air-to-fuel ratio determining whether the engine speed difference is within a predetermined specified range and, if not, aborting the process of testing and making any adjustment of the air-to-fuel ratio and continuing to use the default air-to-fuel ratio for operation of the engine normally for the remainder of the period of continuous operation of the engine.

2. The engine control process of claim 1 wherein the time limit for the total engine running time is not more than 25,000 revolutions for a two-cycle engine.

3. The engine control process of claim 1 wherein the time limit for the total engine running time is not more than 50,000 revolutions for a four-cycle engine.

4. The engine control process of claim 1 wherein during the process of testing the air-to-fuel ratio if the engine speed becomes less than 6,000 RPM or more than 10,000 RPM's for a two-cycle engine, the default air-to-fuel ratio is used for the remainder of the period of engine continuous operation.

5. The engine control process of claim 1 wherein during the process of testing the air-to-fuel ratio if the engine speed becomes less than 6,000 RPM or more than 9,000 RPM for a four-cycle engine, the default air-to-fuel ratio is used for the remainder of the period of engine continuous operation.

6. The engine control process of claim 1 wherein the process of testing the air-to-fuel ratio comprises:
sensing a first engine speed using the default air-to-fuel ratio;
enleaning the air-to-fuel ratio;
sensing a second engine speed resulting from the enleaning of the air-to-fuel ratio;
determining whether the difference between the first and second engine speeds is between a minimum threshold of 0 to 100 RPM and a maximum threshold of 100 to 500 RPM and, if so, using the default air-to-fuel ratio for the remainder of the engine continuous operation.

7. The engine control process of claim 6 further comprising:
sensing a third engine speed after the engine operation recovers from the enleaning of the air-to-fuel ratio;
determining whether the difference between the first and third engine speeds is in the range of 0 to 250 RPM and, if not, using the default air-to-fuel ratio for the remainder of the period of engine continuous operation.

8. The engine control process of claim 1 further comprising:
sensing a third engine speed resulting from the enleaning of the air-to-fuel ratio;
determining whether the difference between the first and third engine speeds is in the range of 0 to 100 RPM and, if not, using the default air-to-fuel ratio for the remainder of the period of engine continuous operation.

9. The engine control process of claim 1 wherein the process of testing the default air-to-fuel comprises the steps of
determining a first engine speed while using the default air-to-fuel ratio of the fuel mixture delivered to the operating engine;
enleaning the air fuel ratio of the fuel mixture delivered to the operating engine;
determining a second engine speed after at least some of the air-to-fuel ratio enleaning event has occurred; and
based at least in part on the difference between the first and second engine speeds, determining whether a change in the default air-to-fuel ratio is needed and, if so, changing to a new air-to-fuel ratio for the fuel mixture delivered to the engine for the remainder of the period of continuous engine operation.

10. An engine control process, comprising:
determining whether the total engine running time from substantially engine start-up is within a predetermined specified time limit;
within the time limit determining whether the engine speed is within a predetermined range for predetermined number of engine revolutions; and, if so, performing an engine speed test comprising the steps of
(a) determining a first engine speed,
(b) changing the air-to-fuel ratio of a fuel mixture delivered to the operating engine,
(c) determining a second engine speed after at least some of the air-to-fuel ratio changing event has occurred,
(d) determining whether a change of air-to-fuel ratio of the mixture delivered to the engine is needed based at least in part on the difference between the first engine speed and the second engine speed; and
(e) if needed, changing the air-to-fuel ratio of the fuel mixture delivered to the engine to a new air-to-fuel ratio of the fuel mixture delivered to the operating engine; and
during such engine speed test determining whether the engine speed remains within a predetermined specified range of engine speeds for a predetermined specified number of engine revolutions and, if not, aborting the engine speed test and using a previously determined air-to-fuel ratio from a prior period of engine operation for at least the remainder of the period of engine continuous operation in which the engine speed test was aborted.

11. The process of claim 10 wherein if the predetermined specified time limit is exceeded before the engine speed is within a predetermined specified range for a specified number of revolutions, the engine speed test is not performed and the previously determined air-to-fuel ratio of the prior period is used for at least the remainder for the period of engine continuous operation.

12. The process of claim 10 further comprising:
after the engine operation recovers from the changing of the air-to-fuel ratio, determining a third engine speed, determining whether the difference between the first and third engine speeds is greater than a threshold speed and, if so, aborting the engine speed test and using the previously determined air-to-fuel ratio of the prior period of engine.

\* \* \* \* \*